W. H. DAMON.
FLUE CUTTER.
APPLICATION FILED FEB. 18, 1909.
946,204.
Patented Jan. 11, 1910.
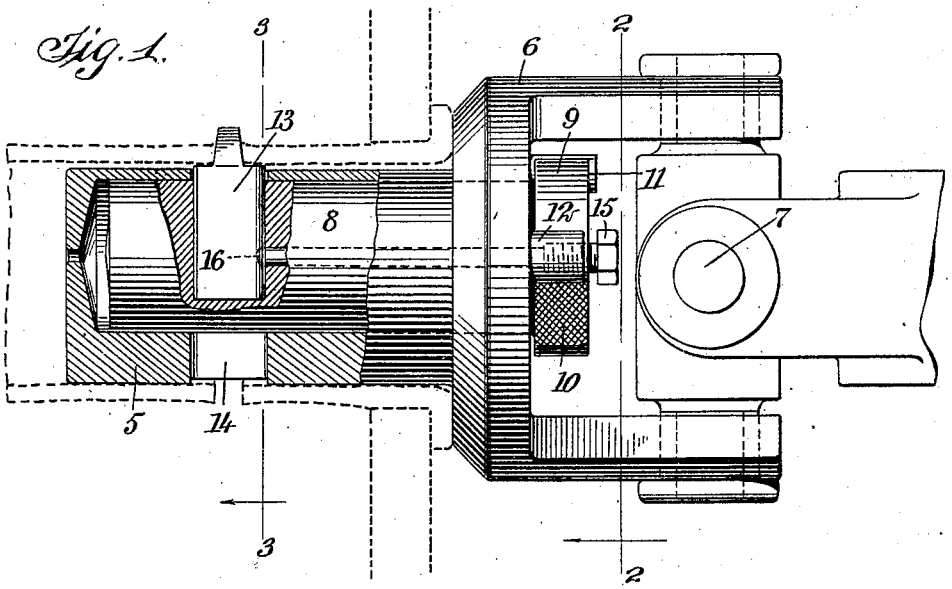
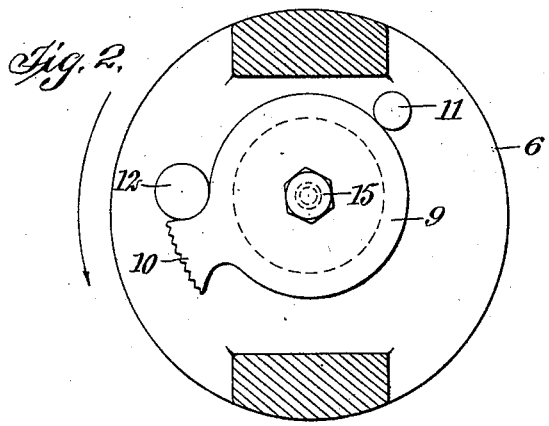
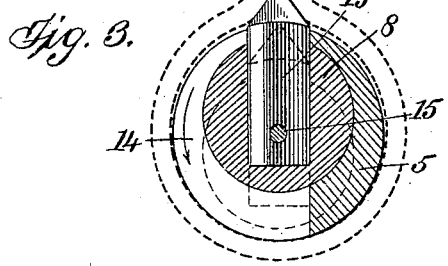
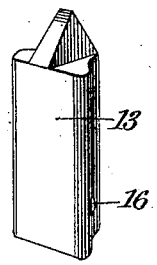
WITNESSES
INVENTOR
William H. Damon
BY
ATTORNEYS

UNITED STATES PATENT OFFICE.

WILLIAM H. DAMON, OF NEW YORK, N. Y.

FLUE-CUTTER.

946,204.  Specification of Letters Patent.  Patented Jan. 11, 1910.

Application filed February 18, 1909. Serial No. 478,556.

*To all whom it may concern:*

Be it known that I, WILLIAM H. DAMON, a citizen of the United States, and a resident of the city of New York, Morris Park, borough of Queens, in the county of Queens and State of New York, have invented a new and Improved Flue-Cutter, of which the following is a full, clear, and exact description.

The invention belongs to that class of flue cutters in which a mandrel to fit within the flue is provided with an eccentrically-arranged tool-carrying shaft having a limited relative rotary movement to project and withdraw the tool.

The invention contemplates a flue cutter of this character, in which the mandrel has a yoke head and the shaft provided with a thumb-controlled member rigid with the shaft and arranged between the arms of the head.

Reference is to be had to the accompanying drawings forming a part of this specification, in which similar characters of reference indicate corresponding parts in all the views.

Figure 1 is a central longitudinal section of a flue cutter constructed in accordance with my invention, the cutter being shown within the flue and in cutting position; Fig. 2 is a cross-section of the same on the line 2—2 of Fig. 1; Fig. 3 is a cross-section on the line 3—3 of Fig. 1, showing in dotted outline the position occupied by the tool-holding shaft and cutting tool when the latter is retracted; and Fig. 4 is a perspective view of the cutting tool.

The invention in its more specific nature embodies a mandrel 5, of a diameter to fit with comparative snugness within the flue, having a yoke head 6 at its outer end which is connected through a universal joint 7 to suitable power-driven means, generally a pneumatic motor. The mandrel 5 is eccentrically bored to receive a tool-holding shaft 8, the latter being provided with a head 9 at its outer end, having a radiating thumb-controlled member 10 which is arranged in the path of stop pins 11 and 12, respectively, to limit the revolution of the tool-holding shaft in each direction. At an intermediate point of the tool-holding shaft it is provided with a diametrical slot or socket to receive the shank of a cutting tool 13, the socket lying in the same transverse plane and in register with a circumferential slot 14 in the mandrel 5, the slot extending around the mandrel for approximately half its circumference.

The shank of the cutting tool is preferably of angular cross-section to offset any tendency of the tool to turn in the tool-holding shaft, in which it is held against radial movement by a locking pin 15, the pin passing centrally through the tool-holding shaft from the outer end of the latter, and at its inner end entering a recess 16 formed in the side of the tool. The outer portion of the locking pin 15 is slightly enlarged and threaded into the tool-holding shaft, as shown in Fig. 1.

When the thumb-piece 10 is in contact with the stop pin 11, the cutting tool is in the position indicated in dotted outline in Fig. 3, in which position the tool is fully withdrawn into the outline of the mandrel. When the thumb-piece 10 is in contact with the stop-pin 12, the tool is fully projected and the point extends sufficiently beyond the mandrel to pass through the wall of the flue, as shown in full lines in both Figs. 1 and 3. The mandrel is passed within the flue until the inner flat face of the head 6 contacts with the flange or bead of the flue adjoining the boiler flue sheet, the cutting tool at this time being fully retracted. The operator on placing his thumb on the thumb-piece 10 starts the motor to revolve the mandrel in the direction indicated by the arrows in Figs. 2 and 3. The momentary holding of the shaft by the thumb-piece 10 causes the cutting edge of the tool to be projected sufficiently to engage the inner wall of the flue, at which time the feeding will continue automatically until the thumb-piece strikes the stop 12, when the cutter will be revolved with the mandrel and cut the flue completely in two upon a single revolution. The operator then reverses the motor, which operates to automatically retract the cutter, at which time the tool may be withdrawn from the flue.

Having thus described my invention, I claim as new and desire to secure by Letters Patent:

In a flue cutter, a mandrel having a yoke head rigid therewith, with the inner face of the head arranged to bear on the end of the flue, a tool-holding shaft eccentrically journaled in the mandrel, a thumb-controlled member rigid with the shaft and arranged within the yoke head of the mandrel, and a stop projecting from the end of the mandrel and arranged in the path of said member to limit the feeding movement of the shaft.

In testimony whereof I have signed my name to this specification in the presence of two subscribing witnesses.

WILLIAM H. DAMON.

Witnesses:
JOHN STEINER,
AIDEN REDMOND.